United States Patent
Kovalev et al.

(10) Patent No.: US 10,740,237 B2
(45) Date of Patent: Aug. 11, 2020

(54) DATA PROCESSING UNIT HAVING A MEMORY PROTECTION UNIT

(71) Applicant: FREESCALE SEMICONDUCTOR, INC., Austin, TX (US)

(72) Inventors: Andrey Kovalev, Lanzenhaar (DE); George Adrian Ciusleanu, Bucharest (RO); Richard Soja, Austin, TX (US)

(73) Assignee: NXP USA, Inc., Austin, TX (US)

( * ) Notice: Subject to any disclaimer, the term of this patent is extended or adjusted under 35 U.S.C. 154(b) by 175 days.

(21) Appl. No.: 14/978,137

(22) Filed: Dec. 22, 2015

(65) Prior Publication Data

US 2017/0090983 A1    Mar. 30, 2017

(30) Foreign Application Priority Data

Sep. 30, 2015 (RO) ................................ A201500707

(51) Int. Cl.
*G06F 12/0842* (2016.01)
*G06F 9/48* (2006.01)

(52) U.S. Cl.
CPC ........ *G06F 12/0842* (2013.01); *G06F 9/4843* (2013.01); *G06F 2212/1041* (2013.01); *G06F 2212/283* (2013.01)

(58) Field of Classification Search
None
See application file for complete search history.

(56) References Cited

U.S. PATENT DOCUMENTS

| 5,812,852 | A | 9/1998 | Poulsen et al. |
| 6,789,256 | B1 | 9/2004 | Kechriotis et al. |
| 7,970,963 | B2 | 6/2011 | Muller |
| 8,565,811 | B2 | 10/2013 | Tan et al. |
| 2012/0215991 | A1 | 8/2012 | Moyer |
| 2013/0073827 | A1* | 3/2013 | Moyer ................ G06F 12/1483 711/168 |
| 2013/0111168 | A1* | 5/2013 | Circello .................. G06F 9/526 711/163 |
| 2013/0332672 | A1* | 12/2013 | Busaba ............. G06F 17/30982 711/108 |

OTHER PUBLICATIONS

Intel® 64 and IA-32 Architectures Software Developer's Manual, vol. 3A: System Programming Guide, Part 1, http://www.intel.com/content/www/us/en/architecture-and-technology/64-ia-32-architectures-software-developer-vol-3a-part-1-manual.html, Chapter 3, pp. 87-102 (16 pages), Sep. 2015.

* cited by examiner

*Primary Examiner* — Wynuel S Aquino
*Assistant Examiner* — Melissa A Headley

(57) ABSTRACT

In a data processing system having a processor and a memory protection unit (MPU), a method includes scheduling, in the processor, a new process to be executed; writing a process identifier (PID) corresponding to the new process into storage circuitry of the MPU; in response to updating the storage circuitry with the PID, configuring the MPU with region descriptors corresponding to the new process; configuring, by an operating system of the processor, the processor to execute the new process in parallel with the configuring the MPU with the region descriptors; and when the configuring the MPU is complete, giving control to the new process to execute on the processor.

10 Claims, 3 Drawing Sheets

US 10,740,237 B2

DATA PROCESSING UNIT HAVING A MEMORY PROTECTION UNIT

BACKGROUND

Field

This disclosure relates generally to data processing systems, and more specifically, to data processing systems with memory protection units.

Related Art

In data processing systems, memory protection units (MPUs) provide access permissions to regions of memory based on region descriptors. For example, these region descriptors may provide a start address, an end address, read/write/execute permissions for each master in the system, and any masks. Alternatively, these region descriptors can define memory regions in different ways, and may include additional information per region. These memory regions are specific per context and thus typically need to be reloaded at every process context switch. Furthermore, it is unknown a priori how many region descriptors may be desired in a system. Therefore, a need exists for a data processing unit with improved flexibility and reduced complexity.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

When switching to a new process context within a processor, a new set of region descriptors is typically required for the new process. In one embodiment, an MPU cache is used to store the region descriptors for a current context. Upon a process context switch to a new process identified by a new PID, the MPU cache is managed in response to a write of the new PID into the MPU. The management of the MPU cache allows for the MPU to configure the appropriate set of region descriptors for the new PID. If the new PID hits in the MPU cache, then the valid bits of the hit entries are asserted. If the new PID misses in the cache, a direct memory access unit (DMA) transfers the appropriate region descriptors directly from a descriptor memory to the cache array. Upon the MPU completing its configuration of the region descriptors, it sets a ready flag to indicate it is ready to operate with the new region descriptors. While the MPU completes its configuration, the operating system of the processor can complete, in parallel, its configuration in preparation to execute the new process. In this manner, when the ready flag in the MPU is set, the operating system can give control to the new process.

Figure 1:
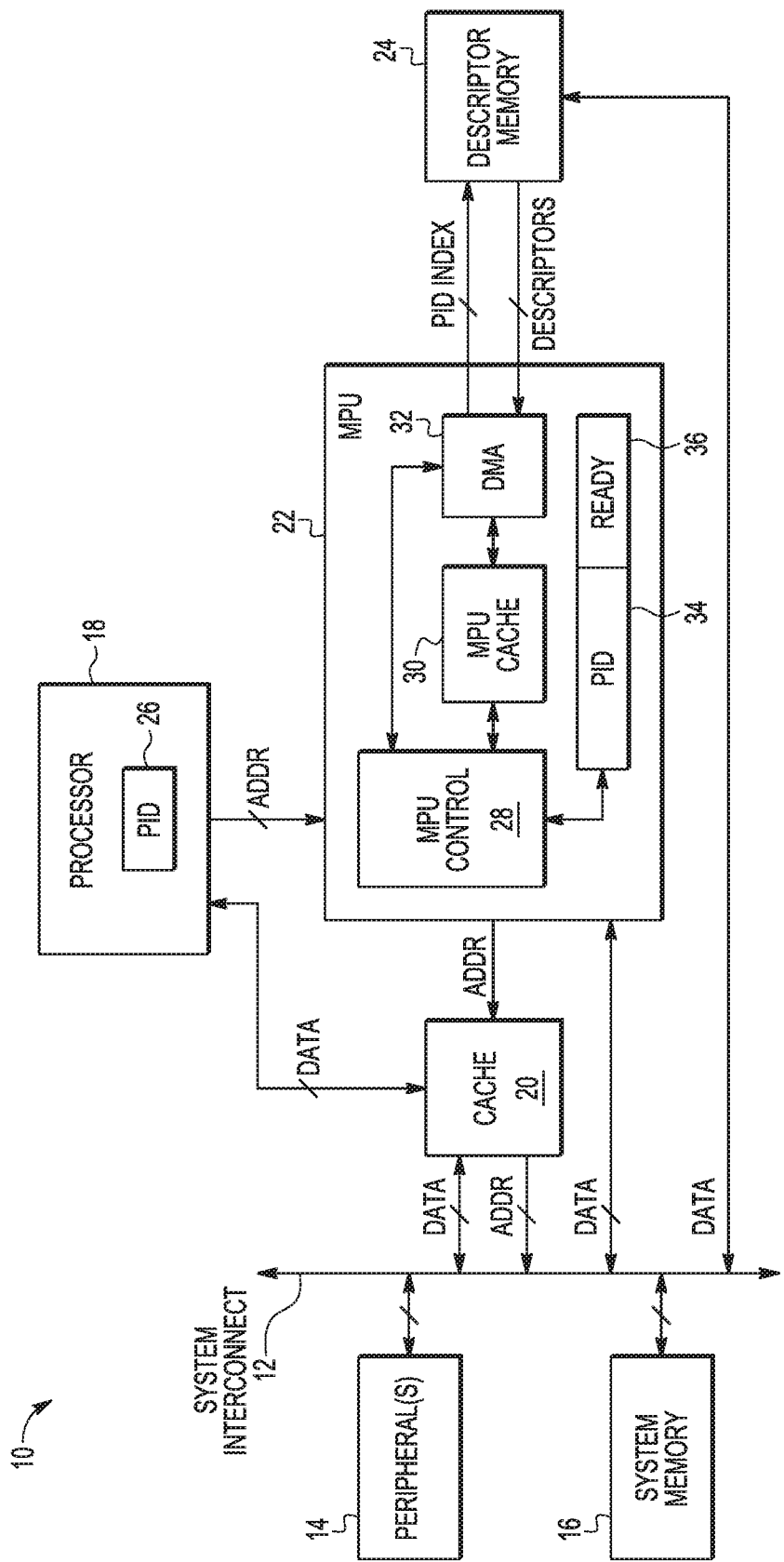
FIG. 1 illustrates, in block diagram form, a data processing system in accordance with one embodiment of the present invention.

FIG. 1 illustrates, in block diagram form, a data processing system 10 in accordance with one embodiment of the present invention. System 10 includes a processor 18, a memory protection unit (MPU) 22, a cache 20, a descriptor memory 24, peripheral(s) 14, a system memory 16, and a system interconnect 12. Peripheral(s) 14 may include one or more peripherals and are each bidirectionally coupled to system interconnect 12. Alternatively, no peripherals may be present. System memory 16 is also bidirectionally coupled to system interconnect 12. Cache 20, corresponding to processor 18, is coupled to system interconnect 12, and processor 18 is coupled to system interconnect 12 by way of cache 20 and MPU 22. Descriptor memory 24 is coupled to MPU 22 and system interconnect 12. In one embodiment, system interconnect 12 is a system bus, but alternatively, system interconnect 12 may be any type of interconnect, such as a cross bar switch, or interconnect fabric or mesh. Note that system 10 may includes any number of processors in addition to processor 18.

In one embodiment, processor 18 includes process identifier (PID) storage circuitry 26 and communicates data with cache 20. Processor 18 also provides addresses to MPU 22. Cache 20 receives addresses from MPU 22, and communicates both data and addresses with system interconnect 12. Cache 20 may be any level cache of processor 18. In one embodiment, processor 18 includes a level 1 cache, and cache 20 is a level 2 cache external to processor 18. Alternatively, cache 20 may be a level 1 cache of processor 18. MPU 22 communicates data with system interconnect 12, provides a PID index to descriptor memory 24, and receives descriptors from descriptor memory 24. MPU 22 includes MPU control circuitry 28, an MPU cache 30, a direct memory access unit (DMA) 32, and storage circuitry which stores a PID 34 and a ready flag 36. MPU control 28 is coupled to PID 34, ready flag 36, MPU cache 30, and DMA 32. MPU cache 30 is coupled to DMA 32, and DMA 32 provides the PID index to descriptor memory 24 and receives the descriptors from descriptor memory 24.

In operation, memory accesses for processor 18 go through both MPU 22 and cache 20. For an access request to a memory location, the address is first provided to MPU 22 to determine if processor 18 has the appropriate permissions for the access. For example, in the case of a write access, MPU 22 determines if processor 18 can write to the access address and in the case of a read access, MPU 22 determines if processor 18 can read from the access address. MPU 22 uses region descriptors for the currently executing PID to determine whether the access is allowed. Each region descriptor corresponds to an address range, which may be defined by a start and end address or by a base address and a parameter that defines a range (e.g. a mask). Each region descriptor includes the access permissions to read/write/execute for the address range for each master in the system. Each region descriptor may also include additional permission information for each address range. When MPU 22 receives an access address, it uses the appropriate region descriptor for the current PID corresponding to the access address. The region descriptor will allow the MPU to determine whether the requested access is allowed. Note that all the region descriptors for a current PID are stored within MPU cache 30. Descriptor memory 24 stores a set of region descriptors for each of N process IDs (PIDs). In one embodiment, descriptor memory 24 is separate from system memory 16, but in alternate embodiments, may be a part of system memory 16. Operation of MPU 22 and descriptor memory 24 will be discussed in more detail below in reference to FIGS. 2 and 3.

Once it is determined that access to an access address is allowed, the address is provided to cache 20. If the access address hits in the cache, cache 20 can provide the requested read data back to processor 18 or store write data to the access address. Note that cache 20 can operate in accordance to any cache protocol, and may operate, for example, as either a write through cache or copyback cache. If the access address misses in cache 20, then the address can be provided, by way of interconnect 12, to system memory 16. Read data can then be read from the access address in system memory 16 or write data can be stored to the access address in system memory 16.

As will be described in more detail below, data can also be written to control registers within MPU 22. For example, data can be written to PID 34 and ready flag 36. In this case, an access address from processor 18 attempting to write to MPU 22 would first go through MPU 22 to ensure that it has permission for the write, and then data can be received by MPU 22 for the write from system interconnect 12. This data for the write can be sourced from either processor 18 or system memory 16.

Figure 2:
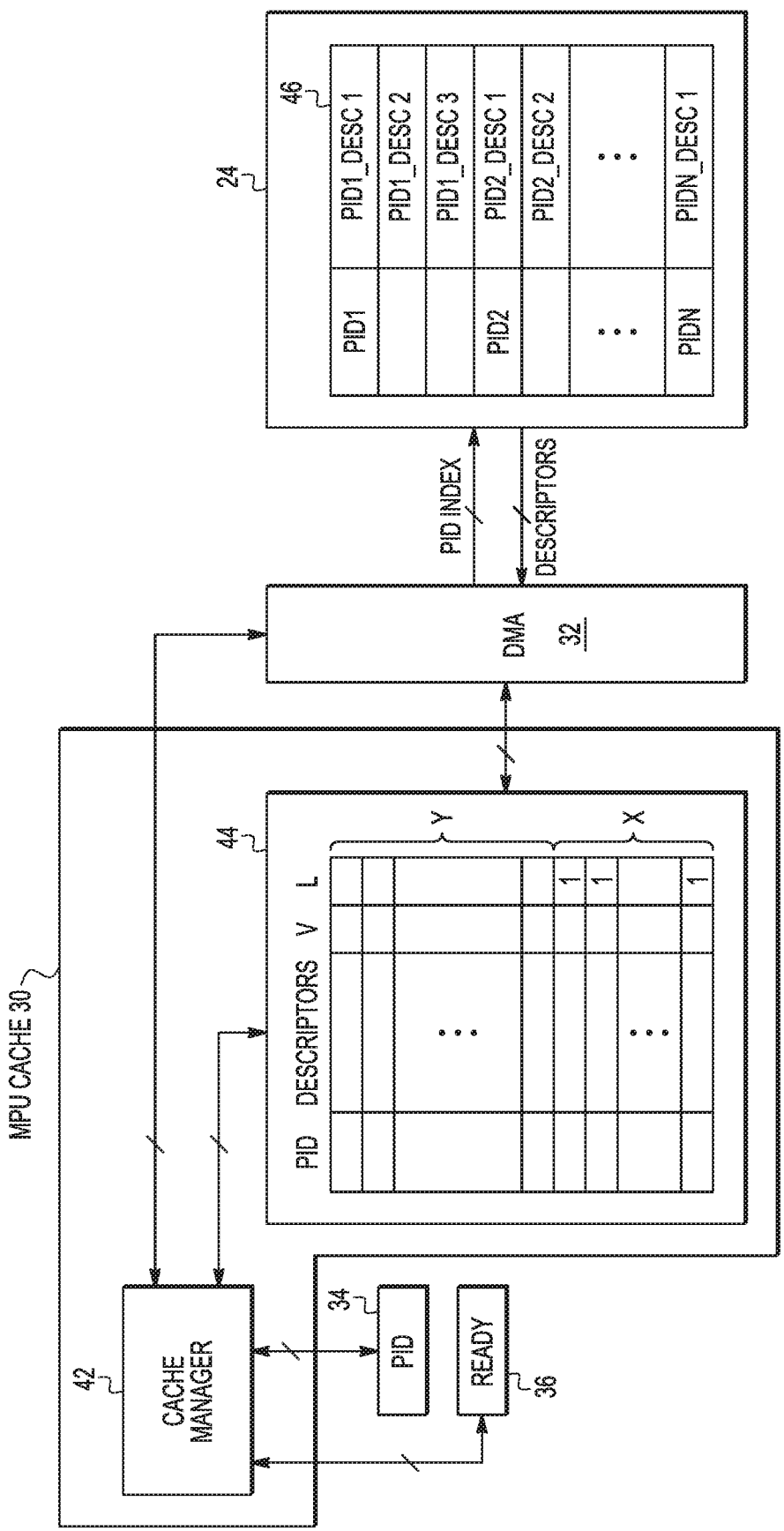
FIG. 2 illustrates an MPU and descriptor memory of FIG. 1 in accordance with one embodiment of the present invention.

FIG. 2 illustrates, in block diagram form, a more detailed view of MPU cache 30, DMA 32, and descriptor memory 24. MPU cache 30 includes a cache manager 42 which is coupled to both PID 34 and ready flag 36. Cache manager 42 is also coupled to MPU cache array 44 and DMA 32. MPU cache array stores a set of cached descriptors, in which each descriptor has a corresponding PID field, valid (V) bit field, and lock (L) bit field. Array 44 includes two sets of cache entries, a set Y and a set X. Set Y corresponds to entries which can be changed or modified, while set X corresponds to those entries which are fixed within array 44. In one embodiment, those entries in set X have their L bit set (e.g. to a logic level 1) so that they may always remain fixed and not be removed when a new entry needs to be allocated. The descriptors in set X may be loaded upon reset by processor 18 and may correspond to region descriptors which are always necessary, such as those for the operating system of processor 18. These may include the descriptors necessary to grant permission for processor 18 to write to control registers of MPU 22, such as PID 34. Therefore, DMA 32 is prevented from loading register descriptors from descriptor memory 24 to the set X of entries. Set Y of descriptors may be loaded, as needed, from descriptor memory 24 by DMA 32.

DMA 32 is tightly coupled to descriptor memory 24 which allows DMA 32 to directly communicate between descriptor memory 24 and cache array 44. Descriptor memory 24 stores a look up table 46 which is configured to store descriptors for each of N PIDs. For example, PID1 has three corresponding descriptor entries, PID1_DESC1, PID1_DESC2, and PID1_DESC3. These refer to three pieces of information which store descriptors for PID1. In one embodiment, each entry may store 1 or more descriptors, and the number of entries per descriptor can vary. Similarly, PID2 has only 2 corresponding descriptor entries, PID2_DESC1 and PID2_DESC2. PIDN only has one corresponding entry, PIDN_DESC1. In this manner, any number of PIDs can be stored in descriptor memory 24, with each PID having any number of corresponding entries. These values can be loaded upon reset of system 10 into descriptor memory 24. Furthermore, for security purposes, they can be loaded using a system port (coupled to system interconnect 12) of descriptor memory 24, after which, the system port can be closed or disabled such that memory 24 remains accessible only by DMA 32.

For a current PID executing on processor 18, PID 34 is used to determine which descriptors to access. If the descriptors for the current PID are not already in array 44, DMA 32, under control of cache manager 42, loads the appropriate entries for the current PID from descriptor memory 24 to array 44. Therefore, DMA 32 provides the PID index corresponding to the current PID to descriptor memory 24, and descriptor memory 24 provides all the entries corresponding to that PID to DMA 32. In one embodiment, table 46 can be in a linked list form so that DMA 32 knows how many entries to provide to cache array 44. If the descriptors for the current PID are already in array 44, then they can be marked as valid and used without needing to reload them from descriptor memory 24. Also, at the end of a process context, any entries in array 44 corresponding to the ended PID can be invalidated with the corresponding V bit.

Figure 3:
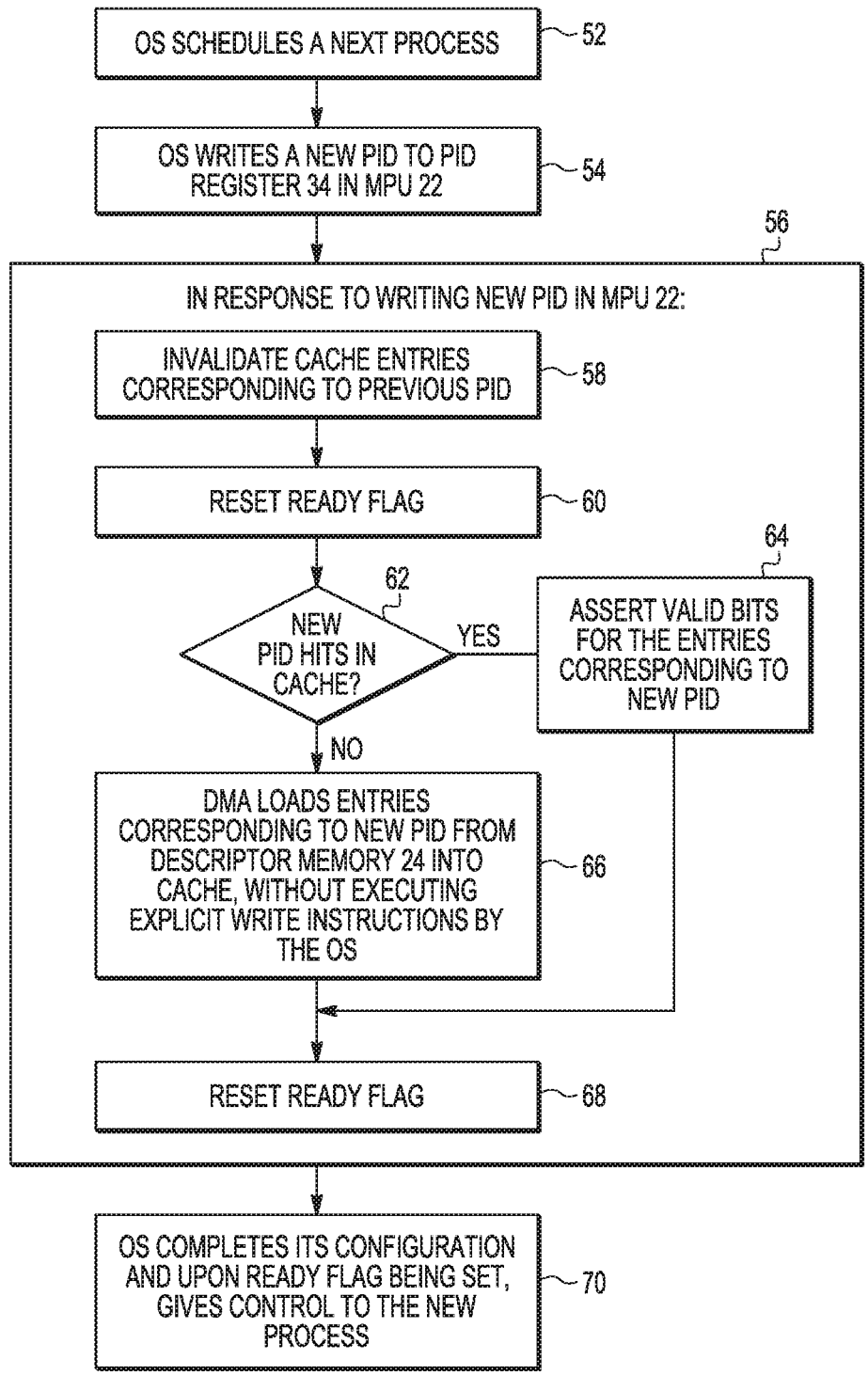
FIG. 3 illustrates, in flow diagram form, a method for managing region descriptors in accordance with an embodiment of the present invention.

Operation of cache 30, DMA 32, and descriptor memory 24 will be further described in reference to FIG. 3. FIG. 3 illustrates a method 50 for managing region descriptors in accordance with one embodiment of the present invention. Method 50 begins with block 52 in which the operating system (OS) of processor 18 schedules a next process to be executed. Method 50 proceeds to block 54 in which the OS write a new PID to PID register 34 in MPU 22. As discussed above, the set of X descriptors in MPU 22 generally gives permission for the OS of processor 18 to write information to the control registers of MPU 22, such as PID 34. Therefore, the OS can execute a write command to PID 34, and the write command is provided to MPU 22. MPU 22 grants permission for the write, and the value of the new PID from processor 18 (which may be stored in storage circuitry 26 of processor 18) is provided to MPU 22 for storage in PID 34. Note that cache manager 42 monitors PID 34 to determine when a new PID value is written to the location (i.e. to determine with PID 34 has been updated). Method 50 proceeds to block 56, in which, in response to the new PID value being written to PID 34, the descriptors for the new PID are managed.

Management of the descriptors begins with block 58 in which the cache entries corresponding to the previous PID are invalidated in cache array 44. That is, any entry in cache array 44 whose PID field matches the previous PID is invalidated. Also, in block 60, the ready flag is reset to a logic level zero indicating that the new descriptors for the new PID are not yet ready for use by MPU 22. After block 60, method 50 proceeds to decision diamond 62 in which it is determined if the new PID (now stored in PID 34) hits in cache array 44. A tag lookup of the new PID is performed with the PID fields of cache array 44. If there is a hit, meaning the descriptors corresponding to the PID are already in cache array 44, then the valid bits for the hit entries corresponding to the new PID are asserted in block 64. If the new PID does not hit in cache array 44, then method 50 proceeds to block 66 in which DMA 32 loads the entries corresponding to the new PID from descriptor memory 24 to cache array 44. That is, DMA 32 provides the new PID as the PID index to descriptor memory 24, and, in response, receives the entries from descriptor memory 24 which correspond to the new PID. These entries are then stored as the new descriptors into cache array 44 and their valid bits are asserted. These stores by DMA 32 from descriptor memory 24 to cache array 44 are performed without executing any explicit write instructions by the OS. That is, in response to the writing of the new PID in PID 34 of MPU 22, the new descriptors are set up either by asserting their valid bits if already present in cache array 44 or by being stored into cache array 44 by DMA 32 without the use of the OS of processor 18. After block 66 or block 64, method 50 proceeds to block 50 in which the ready flag is set, such as to a logic level one, by cache manager 42 to indicate that the descriptors for the new PID are ready for use by MPU 22.

Note that while the descriptors are being set up by DMA 32 in response to cache manager 42 determining that a new PID was written to PID 34, the OS executing on processor 18 can continue with additional operations which may be needed to prepare for the process context switch. That is, since explicit writes are not required for setting up the new descriptors, the OS can proceed with other tasks to prepare for the process context switch. After block 56, method 50 proceeds with block 70 in which the OS completes its configuration, and upon the ready flag being set, the OS gives control to the new process. Therefore, while MPU 22 performs its configuration of descriptors in response to writing a new PID in PID 34, the OS can continue to prepare, in parallel to the configuration operations of MPU 22, to execute the new process. If MPU 22 is not yet ready once the OS completes its configurations, the OS can wait until the ready flag is set.

Therefore, by now it can be appreciated how descriptors of an MPU can be managed in response to a write of the new PID into the MPU. If the new descriptors are already present in the MPU cache array, then they can be indicated as valid. However, if they are not already present in the MPU cache array, they can be transferred into the cache array by a DMA directly from the descriptor memory. In this manner, while the MPU is completing its configuration of the descriptors for the new process, the OS of the processor can continue to perform its configurations needed for executing the new process. This allows for improved flexibility and efficiency process switching.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 10 are circuitry located on a single integrated circuit or within a same device. Alternatively, system 10 may include any number of separate integrated circuits or separate devices interconnected with each other. For example, memory 16 may be located on a same integrated circuit as processor 18 or on a separate integrated circuit or located within another peripheral or slave discretely separate from other elements of system 10. Peripheral(s) 14 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, system 10 may includes multiple processors, each processor having its own MPU having an MPU cache and access to a descriptor memory, such as MPU 22. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, in a data processing system having a processor and a memory protection unit (MPU), a method includes scheduling, in the processor, a new process to be executed; writing a process identifier (PID) corresponding to the new process into storage circuitry of the MPU; in response to updating the storage circuitry with the PID, configuring the MPU with region descriptors corresponding to the new process; configuring, by an operating system of the processor, the processor to execute the new process in parallel with the configuring the MPU with the region descriptors; and when the configuring the MPU is complete, executing the new process. In one aspect of the above embodiment, the configuring the MPU with the region descriptors is performed without performing writes by the processor. In another aspect, in response to updating the storage circuitry with the PID, clearing a ready indicator to indicate that the configuring of the MPU is not complete. In a further aspect, the method further includes, when the configuring the MPU is complete, setting the ready indictor, wherein the executing the new process is performed in response to the ready indicator being set. In another aspect, the MPU includes a cache array having a plurality of entries, each entry having a PID field, a region descriptor field, and a valid field, wherein configuring the MPU with the region descriptors corresponding to the new process includes determining if the PID hits in a cache array of the MPU by comparing the PID with the PID fields of the cache array; and if the PID hits in the cache array, asserting the valid field of each entry which hit. In a further aspect, the data processing system further includes a descriptor memory which stores one or more region descriptors corresponding to each of N process identifiers, wherein configuring the MPU with the region descriptors corresponding to the new process further includes, if the PID misses in the cache array, using a direct memory access (DMA) to load the one or more region descriptors corresponding to the new process from the descriptor memory to the cache array. In yet a further aspect, the descriptor memory is within a system memory of the data processing system. In another further aspect, each entry in the cache array further comprises a lock field, the method further includes upon reset of the processor, loading a set of region descriptors into a first plurality of entries of the cache array and setting the lock field of each of the first plurality of entries. In an even further aspect, the loading the one or more region descriptors corresponding to the new process from the descriptor to the cache array includes loading the one or more region descriptors into a second plurality of entries in the cache array whose lock field is negated. In another further aspect, the method further includes preventing the DMA from loading register descriptors from the descriptor memory to the first plurality of entries of the cache array. In another aspect, configuring the MPU with the region descriptors corresponding to the new process further includes invalidating cache entries of the cache array which correspond to a previous process.

In another embodiment, a data processing system includes a processor configured to switch from executing a previous process to executing a new process, the new process having a corresponding process identifier (PID); a memory protection unit (MPU) having an MPU cache array, wherein each entry in the MPU cache array includes a PID field, a region descriptor field, and a valid field; a descriptor memory configured to store one or more region descriptors for each of N process identifiers; and a direct memory access (DMA), wherein the DMA is configured to load region descriptors from the descriptor memory into the MPU cache array in response to the PID missing in the MPU cache array. In one aspect of the another embodiment, the processor is configured to write the PID into storage circuitry of the MPU, wherein the MPU is configured to, in response to updating the storage circuitry with the PID, determine whether the PID hits or misses in the cache array. In a further aspect, the MPU is configured to, in response to the PID hitting in the cache, assert a valid field of each hit entry. In an even further aspect, the MPU further includes storage circuitry configured to store a ready indicator, wherein the MPU is configured to, in response to updating the storage circuitry with the PID, negating the ready indicator, and in response to the DMA loading the region descriptors or the MPU asserting the valid field of each hit entry, asserting the ready indicator. In yet a further aspect, the processor is configured to perform operations to prepare for executing the new process in parallel to the DMA loading the region descriptors or the MPU asserting the valid field of each hit entry, and the processor is configured to begin executing the new process after the ready indicator is asserted. In another aspect, the DMA is configured to receive a PID index from the DMA indicating the PID and configured to provide one or more region descriptors corresponding to the PID to the DMA in response to the PID index.

In yet another embodiment, in a data processing system having a processor and a memory protection unit (MPU), the MPU having a cache array having a plurality of entries, each entry having a PID field, a region descriptor field, and a valid field, a method includes scheduling, in the processor, a new process to be executed; writing a process identifier (PID) corresponding to the new process into storage circuitry of the MPU; in response to updating the storage circuitry with the PID: determining if the PID hits in a cache array of the MPU by comparing the PID with the PID fields of the cache array, if the PID hits in the cache array, asserting the valid field of each entry which hit, and if the PID misses in the cache array, using a direct memory access (DMA) to load the one or more region descriptors corresponding to the new process from the descriptor memory to the cache array; and configuring, by an operating system of the processor, the processor to execute the new process in parallel with asserting the valid field of each entry which hit or using the DMA to load the one or more region descriptors. In one aspect of the yet another embodiment, the method further includes, in response to updating the storage circuitry with the PID, clearing a ready indicator, and after asserting the valid field of each entry which hit or using the DMA to load the one or more region descriptors, asserting the ready indicator; and after asserting the ready indicator, executing the new process on the processor. In another aspect, the one or more region descriptors are loaded into the cache array without performing writes by the processor to the MPU.

What is claimed is:

1. A data processing system comprising:
a processor configured to switch from executing a previous process to executing a new process, the new process having a corresponding process identifier (PID);
a descriptor memory configured to store one or more region descriptors for each of N process identifiers, wherein N is an integer greater than two;
a memory protection unit (MPU) having an MPU cache array distinct from the descriptor memory, the MPU cache array having a plurality of entries, each entry in the MPU cache array configured to store a cached region descriptor from the descriptor memory, wherein each entry in the MPU cache array includes a PID field, a region descriptor field, and a valid field, the MPU also having storage circuitry, the processor configured to write the PID of the new process to the storage circuitry of the MPU, wherein the MPU is configured to, in response to updating the storage circuitry with the PID, determine whether the PID hits or misses in the MPU cache array by performing a tag lookup of the PID with the PID fields of the MPU cache array;
a direct memory access (DMA) connected to the MPU cache array and connected to the descriptor memory and configured to provide region descriptors from the descriptor memory to the MPU cache array, wherein the DMA is configured to load region descriptors corresponding to the PID of the new process from the descriptor memory into the MPU cache array in response to the PID missing in the MPU cache array, wherein the MPU is configured to, in response to the PID hitting in the MPU cache array, assert a valid field of each hit entry; and
wherein the MPU further comprises storage circuitry configured to store a ready indicator, wherein the MPU is configured to, in response to updating the storage circuitry with the PID, negating the ready indicator, and in response to the DMA loading the region descriptors or the MPU asserting the valid field of each hit entry, asserting the ready indicator.

2. The system of claim 1, wherein the processor is configured to perform operations to prepare for executing the new process together with the DMA loading the region descriptors or the MPU asserting the valid field of each hit entry, and the processor is configured to begin executing the new process after the ready indicator is asserted.

3. The system of claim 1, wherein the DMA is configured to receive a PID index from the DMA indicating the PID and configured to provide one or more region descriptors corresponding to the PID to the DMA in response to the PID index.

4. In a data processing system having a processor, a descriptor memory configured to store one or more region descriptors for each of N process identifiers, and a memory protection unit (MPU), the MPU having an MPU cache array distinct from the descriptor memory and configured to store a subset of region descriptors of the descriptor memory and having a plurality of entries, each entry having a PID field, a region descriptor field, and a valid field, a method comprises:
scheduling, in the processor, a new process to be executed;
writing a process identifier (PID) corresponding to the new process into storage circuitry of the MPU;
in response to updating the storage circuitry with the PID: determining if the PID hits in the MPU cache array of the MPU by comparing the PID with the PID fields of the MPU cache array, if the PID hits in the MPU cache array, asserting the valid field of each entry which hit, and if the PID misses in the MPU cache array, using a direct memory access (DMA) to load one or more region descriptors corresponding to the PID of the new process from the descriptor memory into the MPU cache array;
configuring, by an operating system of the processor, the processor to execute the new process together with asserting the valid field of each entry which hit or using the DMA to load the one or more region descriptors; and
in response to updating the storage circuitry with the PID, clearing a ready indicator, and after asserting the valid field of each entry which hit or using the DMA to load the one or more region descriptors, asserting the ready indicator; and after asserting the ready indicator, executing the new process on the processor.

5. The method of claim 4, wherein the one or more region descriptors are loaded into the MPU cache array without performing writes by the processor to the MPU.

6. The method of claim 4, further comprising, when configuring the MPU is complete, setting the ready indictor, wherein the executing the new process is performed in response to the ready indicator being set.

7. The method of claim 4, wherein the descriptor memory is within a system memory of the data processing system.

8. The method of claim 4, wherein each entry in the MPU cache array further comprises a lock field, the method further comprising: upon reset of the processor, loading a set of region descriptors into a first plurality of entries of the MPU cache array and setting the lock field of each of the first plurality of entries.

9. The method of claim 8, wherein the loading the one or more region descriptors corresponding to the new process from the descriptor memory to the MPU cache array comprises loading the one or more region descriptors into a second plurality of entries in the MPU cache array whose lock field is negated.

10. The method of claim 4, wherein in response to updating the storage circuitry with the PID, the method further comprises:
invalidating cache entries of the MPU cache array which correspond to a previous process identifier.

* * * * *